United States Patent [19]

Castle et al.

[11] Patent Number: 5,237,864

[45] Date of Patent: Aug. 24, 1993

[54] DEVICE FOR PRECISE MEASUREMENT OF FORCE

[76] Inventors: Craig A. Castle, 2220 Cutler St., Simi Valley, Calif. 93065; William L. Cooper, 2-1171 E. Cliff Dr., Santa Cruz, Calif. 95062; Robert S. Smith, 1263 Emory St., San Jose, Calif. 95126

[21] Appl. No.: 729,166

[22] Filed: Jul. 12, 1991

[51] Int. Cl.$^5$ ............................................... G01L 1/04
[52] U.S. Cl. ................................. 73/161; 73/862.634; 73/862.639
[58] Field of Search .................. 73/862.65, 500, 161; 177/211, 210 C, 862.61, 862.621, 862.53, 862.627, 862.634, 212, DIG. 6

[56] References Cited

U.S. PATENT DOCUMENTS

| | | | |
|---|---|---|---|
| 3,993,150 | 11/1976 | Brosh et al. | 177/211 |
| 4,113,040 | 9/1978 | Storace | 177/211 |
| 4,212,197 | 7/1980 | Kawai et al. | 73/862.65 |
| 4,655,305 | 4/1987 | Jacobson | 73/862.65 |

Primary Examiner—Donald O. Woodiel
Assistant Examiner—R. Biegel
Attorney, Agent, or Firm—Robert Samuel Smith

[57] ABSTRACT

A device for measuring force of bending of a head-flexure assembly including a load cell with a cell reference surface slidably mounted on a base having a reference surface, a shaft threaded into the load cell with a first thread and threaded into the base with a second thread so that by turning the shaft, the distance between the two reference surfaces can be very accurately adjusted providing that the device can be calibrated to an accuracy of less than ten milligrams.

4 Claims, 1 Drawing Sheet

DEVICE FOR PRECISE MEASUREMENT OF FORCE

BACKGROUND

1. Field of the Invention

This device relates to devices for measuring force and particularly to a device that measures the force exerted by the flexure spring that supports a magnetic recording head.

2. Prior Art and Informatio Disclosure Statement

Disk files for magnetic recording include a one or more magnetic recording heads held against a rotating memory disk. The surface of the head facing the moving disk surface is contoured so that an airbearing is generated at the interface (the region between the two surfaces) that maintains the separation of the two surfaces. The separation for present day disk files is less than five microinches. It must be maintained very accurately, i.e. within a microinch in order to maintain a uniform predictable recording signal from the head and in order to help prevent contact between the two surfaces that would lead to damage of the recording surface. The force that maintains the head at this spacing from the disk is very small, typically grms. and must be maintained at a precise value.

The standard construction for supporting the head is a leaf spring or flexure of a thin metal sheet, typically about an inch or so long and one half an inch wide in todays diskfiles. The head is secured at one end of the broad side of the flexure facing the disk. The other end of the flexure is clamped to the arm of an actuator that positions the head on the desired recording track on the disk surface. The precise value of force applied by the head against the disk can only be achieved by accurately positioning the clamping location with respect to the disk surface and by accurately controlling various factors that influence fexing of the flexure. These factors include, dimensions of the flexure (including thickness), the location of the head on the flexure relative to the clamping location, residual stresses in the flexure that might affect flatness of the flexure in the unstressed condition, etc. Because of the criticality of the head force load and the numerous factors that must be controlled to achieve the required head load force, it is standard practice to test the flexing properties of each head-flexure assembly before it is built into the diskfile assembly.

A device and method for testing the force characteristics of the head flexure assembly has been developed by the Automatech Corporation located in Santa Cruz, Calif.

The test device includes a reference plate having a plate reference surface.

A load cell is mounted on the plate reference surface and has a cell reference surface against which the force to be measured is applied thereby generating an electronic signal. The signal is displayed as force against the cell surface expressed in grams.

The device is calibrated by resting a precisely known calibrating weight on the cell reference surface then adjusting electronic parameters of the measuring circuit until the displayed value of force equals the calibrating weight. This procedure ensures that the cell display will present an accurate measurement of the force exerted against the cell reference surface.

Next, a test yoke is placed on the reference surface straddling the cell reference surface so that a reference surface on the yoke faces the cell reference surface. The legs of the yoke have been precisely machined so that the difference between the height of the reference surface on the yoke above the plate reference surface and the height of a flexure clamp surface above the plate reference surface equals a value corresponding to the distance of the flexure clamping surface on the file from the disk surface. Then a screw connecting the cell to the reference plate is turned to bring the cell reference surface into contact with the yoke reference surface. Contact of the cell reference surface with the yoke reference surface is that position of the screw where the display of force jumps from zero to a value greater than ten milligrams (since the display of present devices will read no smaller than ten milligrams and the present screw arrangement allows for no controlled adjustment finer than ten milligrams.

The steps described in the two preceding paragraphs are the steps required to calibrate the force testing device to display the correct force when the flexure is clamped in the test device with the head in contact with the cell reference surface so that the flexure is bent an amount equal to the bend that is imposed on the same flexure when mounted in the disk file.

The quality control procedure is to place each head-flexure assembly in the calibrated test fixture so that the test device will display a force that must be within prescribed limits in order for it to be accepted for mounting into a disk file. The device according to the prior art displays a value of force out to hundredths of a gram thereby requiring a requirement to calibrate the device to within a hundredth of a gram.

The present trend in disk files is toward ever smaller disk files requiring smaller head loading forces and calibration procedures that are mor precise than ten milligrams.

THE INVENTION

Objects

It is an object of this invention to provide a device for accurately bending a head-flexure assembly with one end of the flexure clamped and the other end secured to the head with the head in contact against a surface and measuring the force exerted by the head against the surface.

It is another object that the force be measured within an accuracy of one milligram.

It is another object that the device be capable of calibration to an accuracy of a milligram.

Summary

This invention is directed toward a device for measuring force of a head-flexure assembly featuring a load cell and a double threaded shaft to move a reference surface on the load cell into contact with a reference surface thereby providing very accurate control in calibrating the device.

The load cell is secured to a first reference surface of a plate having a second reference side opposite the first reference side. A clamping fixture has a reference surface spaced securely above the plate reference surface so that the flexure may be clamped to the clamping surface with the head in contact with the cell reference surface to apply a force that is displayed by the circuitry associated with the load cell.

DRAWINGS

DESCRIPTION OF A PREFERRED EMBODIMENT

The following detailed description illustrates the invention by way of example and not by way of limitation of the principles of the invention. This description will clearly enable one skilled in the art to make and use the invention and describes embodiments and modifications including what I presently believe to be the best mode for carrying out the invention.

Figure 1:
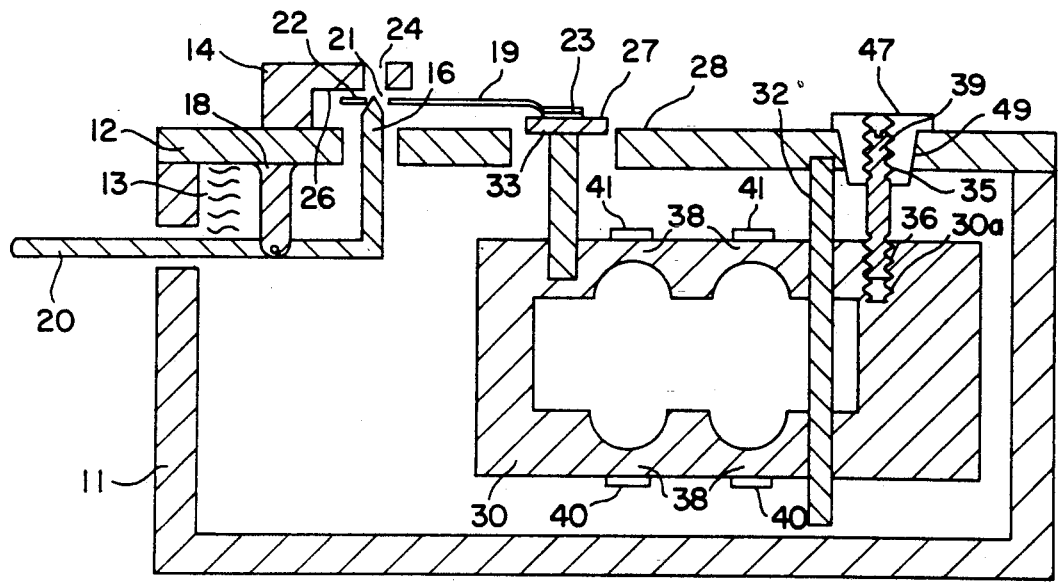
FIG. 1 shows a cross sectional view of the force measuring device of this invention.

Turning to a description of the drawings, FIG. 1 shows a force measuring device of this invention. There is shown supported on a base 11, a reference plate 12 having a clamping fixture including a fixed jaw 14 and a movable jaw 16 that is hingably supported on the reference plate 12 by fulcrum 18 and spring loaded to the closed position by spring 13. The jaws are opened by pressing on movable jaw 16 at location 20 to permit insertion of the clamped end of the flexure 19 between the jaws where it is centered by taper end 22 centered to hole 24 in jaw 14 and hole 21 in the flexure 19. The surface at the end of the flexure is clamped against base reference surface 26 which is spaced very accurately above plate reference surface 28 according to the required amount of bend in the flexure. The load cell assembly 30 is slidably mounted on a post 32 secured at one end to the reference plate 12. The recording head 23 of the head-flexure assembly rests against a cell reference surface 27 of a stool 33 extending from load cell assembly 30. Therefore, the distance of the cell reference surface 27 can be selected by a coarse adjustment made by turning bushing 47 which is tapered to fit a hole in plate 12 and a fine adjustment made by turning shaft 39 which is threaded into bushing 47 with one thread 35 and into the load cell 30 with another thread 36. Bushing 47 is tapered to provide a close fit between the bushing and plate.

The load cell assembly 30 includes a frame with four sides with two narrow sections 38 on each of two opposing legs. Four strain gages 40 and 41 are shown with a strain gage located adjacent to each narrow section 38.

Figure 2:
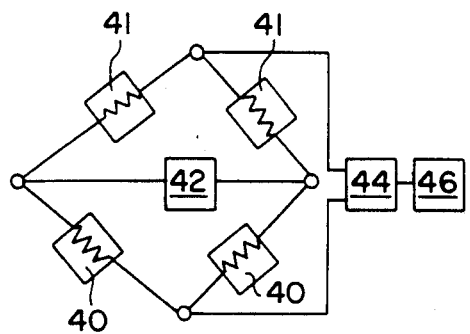
FIG. 2 shows the electronic circuitry that is used in conjunction with the device shown in FIG. 1

The strain gages may be connected as members of a wheatstone bridge (see FIG. 2) having a power supply 42, amplifier 44 and display 46 connected to the bridge. Operation of wheatstone bridges are well known for this purpose. When a force is exerted against cell reference surface 27, tension is applied to strain gages 41 and compression is applied to gages 40 thereby generating a signal that is read as a force on display 46 in FIG. 2.

The method of calibrating the device is described with reference to FIG. 3 and FIG. 4.

Figure 3:
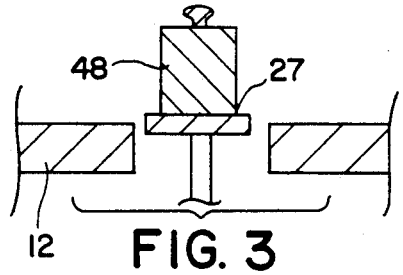
FIG. 3 shows the the first step in calibrating the force measuring device.

Referring to FIG. 3, in the first step a standard weight 48 (e.g., 100.00 grams) is placed on the reference surface 27 and adjustments are made to the circuit (amplifier and/or display) to display, (e.g., 100.00 grams.)

Figure 4:
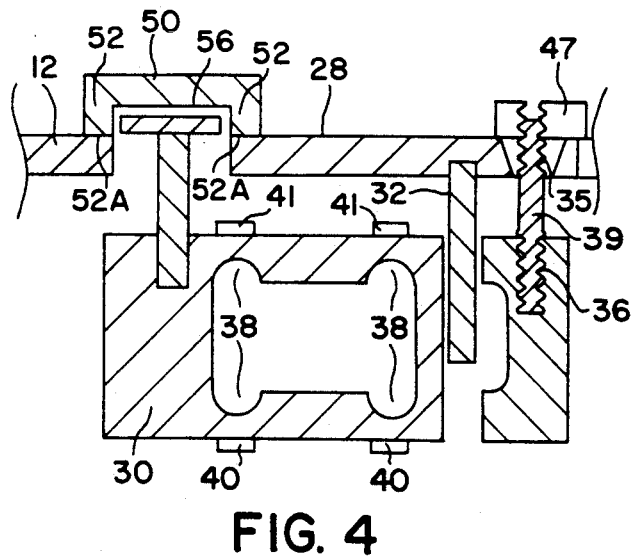
FIG. 4 shows the second step in calibrating the force measuring device.

Referring to the second step illustrated in FIG. 4, the weight 48 is removed and a yoke 50 is placed on the reference plate 12. The legs 52 have been carefully machined to establish the required distance between plate reference surface 28 and yoke reference surface 56. First bushing 47 the shaft to shift axially without turning thereby coarsely adjusting the position of shaft 39. Then with the bushing stationary, the shaft 39 is turned causing the cell to slide on the shaft 32 for fine adjustment to a position where cell reference surface 27 barely touches yoke reference surface 56 as indicated by the jump of the display 46 (FIG. 2) from 000.000 to 000.001, i.e., less than 10 milligrams. By this procedure, the cell reference surface 27 has been located at a distance from the base reference surface 26 equal to the operating distance between the recording surface and the flexure support surface of a disk drive so that when a flexure whose force characteristics are to be tested is clamped against the base reference surface 27, the head 23 will exert a force between the cell reference surfface 27 and the base reference surface 26 exerted between the head on the recording surface and the flexure support surface in a disk drive. The yoke used to calibrate the fixture as described above depends on the specifications of the disk drive. The device has now been fully calibrated by bringing the cell reference surface 27 into contact with the yoke reference surface 56 when the leg reference surfaces on the ends of legs 52 are referenced to base reference surface 26.

The force exerted by the flexures may now be measured by clamping the clamping end of the flexure 19 between the clamping jaws, 14 and 16 with the head 23 resting against the cell reference surface 27.

The ability to adjust the position of the cell reference surface 27 by controlling the force of the cell reference surface against the yoke reference surface with the two threaded shaft 33 is a major feature of this invention. A number of thread combinations could be selected to produce the required effect but to illustrate, if thread 35 were thirty six threads per inch and thread 36 were forty threads per inch, then rotating the shaft 33 one complete turn would shift the cell reference surface by only 0.002 inches thereby providing that adjustments of calibration in the range of one milligram can be achieved.

In the foregoing paragraphs, an embodiment has been described which meets the objects of the invention. A device has been described for measuring force applied by controlled flexing of a head-flexure assembly wherein accuracy of calibration of the device can be controlled to less than 10 milligrams. Modifications to the embodiment may occur to one after studying the description and drawings which are within the scope of the invention. For example, the double threaded shaft may be replaced by a first tube having one thread on the inside and another thread on the outside with the stool providing the cell reference onto the surface supported on a second tube that is threaded onto the outside of the first tube. The load cell may comprise a different arrangement of strain gages. The reference plate may be replaced by a reference base having a shape different from a plate. We therefore wish our invention to be defined by the scope of the appended claims and in view of the specification if need be.

We claim:

1. A device for measuring an absolute force applied between two surfaces separated by a required distance which comprises:

a base means for supporting a load cell and having a plate reference surface on top of said base means and an area having a first threaded hole;

a clamp means attached to said base means adapted for clamping a flexure end of a head flexure against a base reference surface with a head of said head flexure resting against said cell reference surface;

a load cell assembly with a cell reference surface facing said base reference surface and spaced therefrom and a second threaded hole in said cell assembly wherein a difference between said number of threads per inch of said first thread and said number of threads per inch of said second thread equals a sensitivity value;

a slide means supported by said base means for slidably supporting said load cell assembly permitting said cell reference surface to be slidably located at an arbitrary distance in a range including said required distance from said base reference surface;

a shaft having a first end and a second end, first and second threaded ends respectively threaded into said first threaded hole and said second threaded hole such that, by turning said shaft, said load cell assembly will slide on said slide means to a location and secured where a distance between said cell and base reference surfaces is said required distance within said range of distances;

means mounted on said load cell for eliciting a signal response to a force applied between said base reference surface and said cell reference surface.

means communicating with said signal eliciting mens for computing a value of said force from said signal and displaying said value.

2. A device as in claim 1 wherein said first threaded hole is in a bushing rotatably positioned in a third hole in the base such that said load cell may be positioned coarsely by rotating said bushing without rotating said shaft thereby moving shaft supporting said load cell assembly over a first distance in a direction parallel to said shaft, then rotating said shaft without turning said bushing such that said shaft turns in said first and second threaded holes thereby moving said load cell assembly over a second distance which is controllable to a tolerance determined by said sensitivity value.

3. A device as in claim 1 which further comprises:
a display means operably connected to said load cell to provide a display of force exerted against said cell reference surface.

4. A device as in claim 1 which comprises a yoke means having two parallel legs, each leg having a first end with a leg reference surface, and a second end connected to a cross member with a yoke reference surface facing said leg ends such that, when said leg reference surface is referenced to said base reference surface, said yoke reference surface is permitted to contact said cell reference surface by turning said shaft.

* * * * *